Dec. 14, 1926.

E. C. PFAFF

CLUTCH

Filed July 20, 1925      3 Sheets-Sheet 1

1,610,814

Inventor:
Ernest C. Pfaff,

Dec. 14, 1926.

E. C. PFAFF

CLUTCH

Filed July 20, 1925  3 Sheets-Sheet 2

1,610,814

Inventor:
Ernest C. Pfaff,

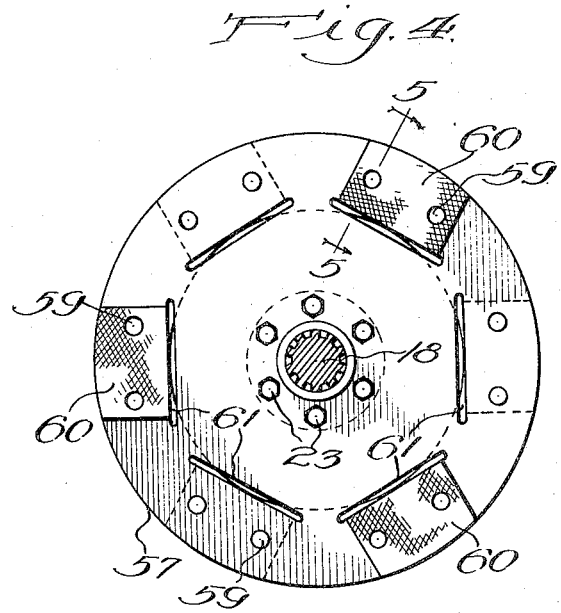
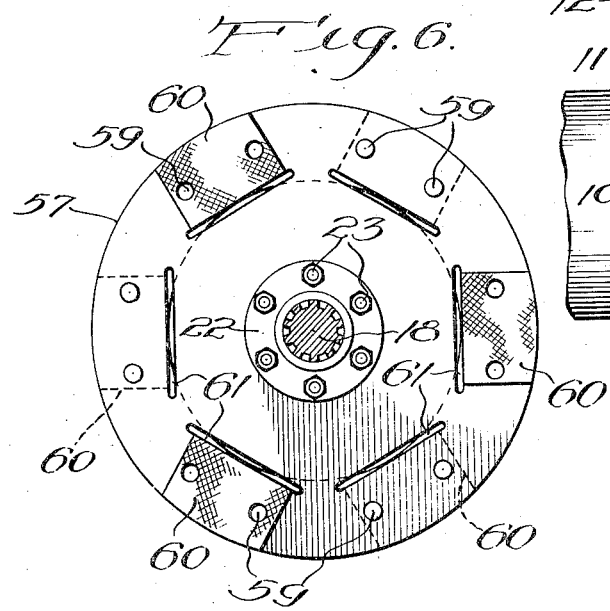
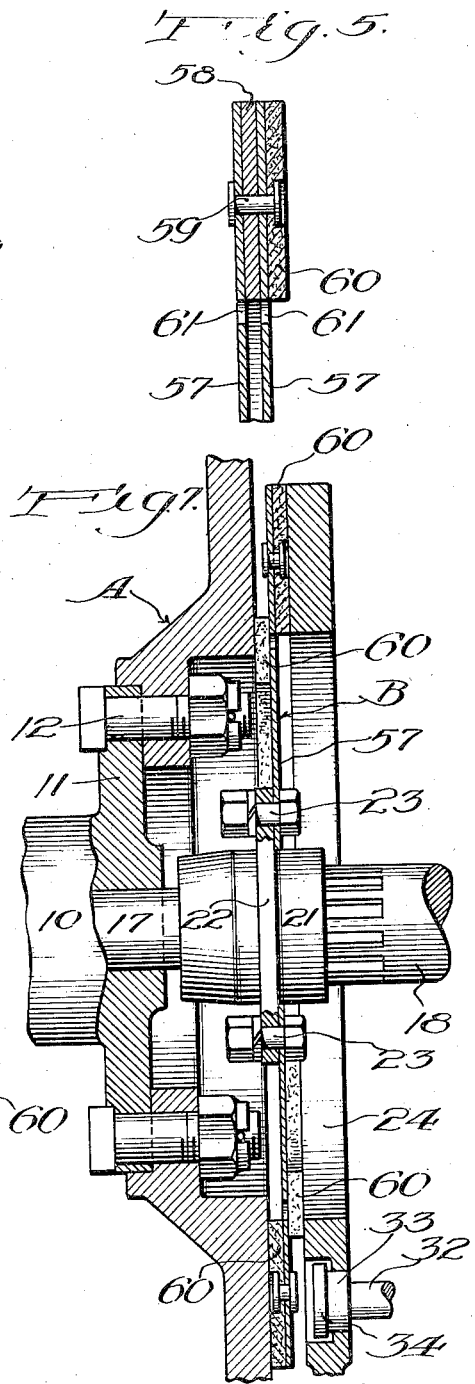

Patented Dec. 14, 1926.

1,610,814

UNITED STATES PATENT OFFICE.

ERNEST C. PFAFF, OF CHICAGO, ILLINOIS.

CLUTCH.

Application filed July 20, 1925. Serial No. 44,725.

This invention which relates to a clutch mechanism adapted for use on motor vehicles, is designed to effect a gradual engagement between the driving and driven members by the use of parts which are simple, inexpensive, and readily assembled.

It is an object of this invention to facilitate operation of the clutch by certain means which may consist of duplex springs normally tending to hold the driving and driven members in engagement; in releasing the members from engagement, however, but one spring unit will oppose the initial movement thereby conducing to a greater ease in control. Also in connection with the disk unit, I utilize certain friction pads arranged in a novel and effective manner, each disk being weakened adjacent the pad so as to flex radially as required under pressure. Various features such as these comprise my invention of which a preferred embodiment is shown in the accompanying drawings in the manner following:

Figure 1 is a longitudinal section through the clutch mechanism in its entirety;

Figs. 2 and 3 are transverse sections therethrough taken respectively on lines 2—2 and 3—3 of Fig. 1;

Fig. 4 is a detail in transverse section through the clutch shaft looking upon one face of the disk unit;

Fig. 5 is a sectional detail taken on line 5—5 of Fig. 4;

Fig. 6 is a view similar to Fig. 4, but looking toward the opposite face of the disk unit; and Fig. 7, which is a view similar to Fig. 1, shows a modification in the disk unit.

Figure 1:
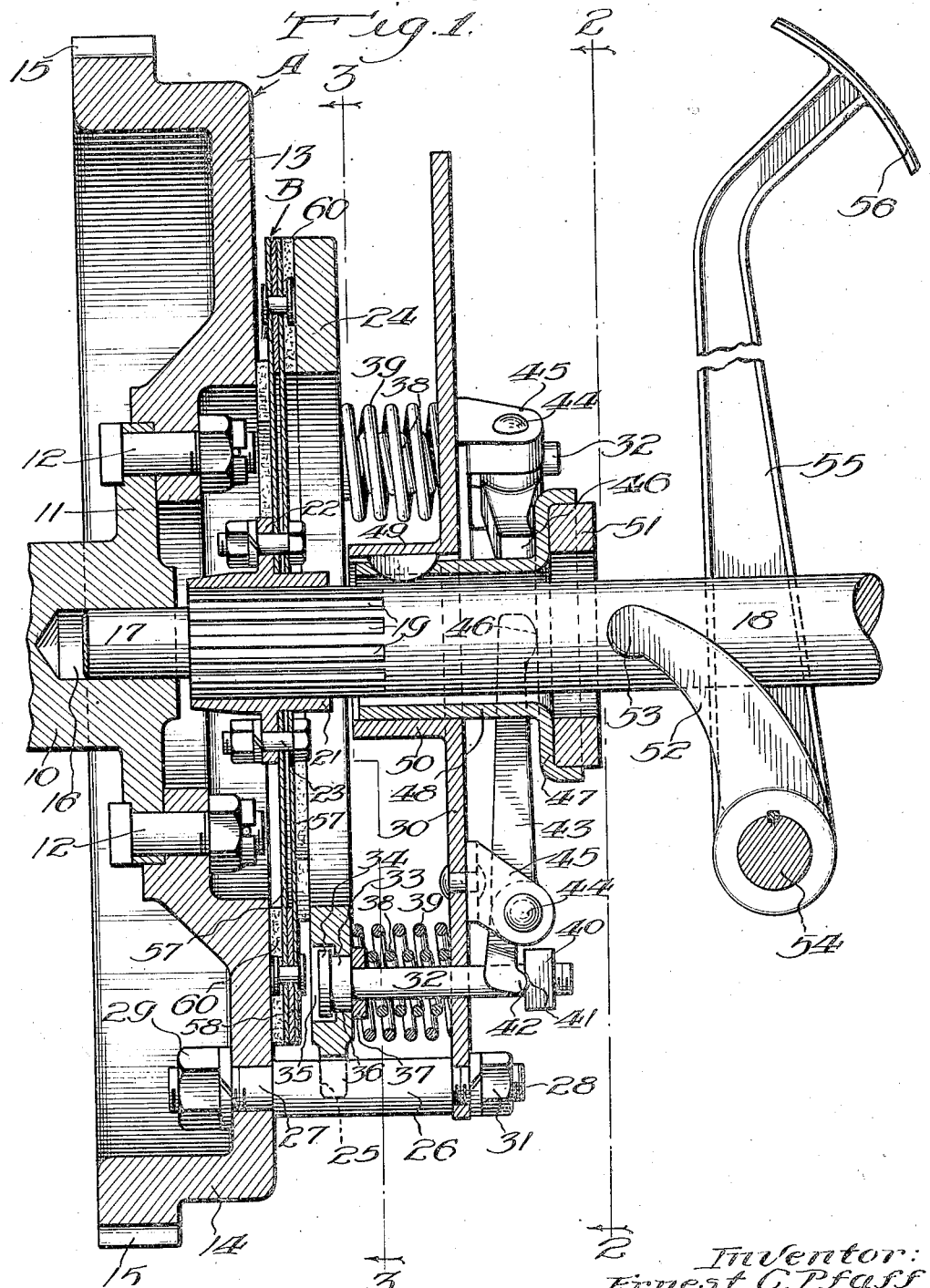
Figure 2:
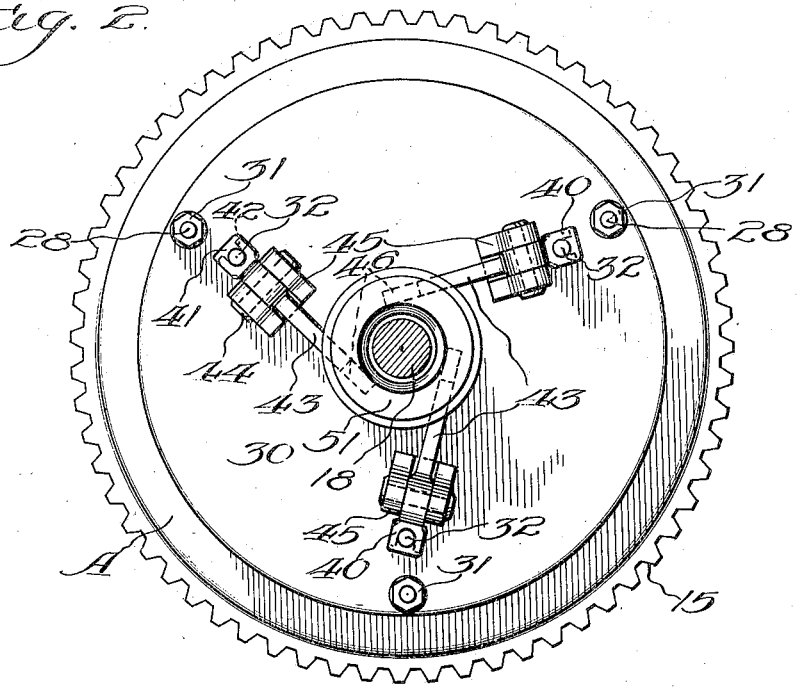

In the drawings I have represented the rear end of an engine shaft 10 having a flange 11 to which the fly wheel A—the driving member—is secured by bolts 12 in the usual manner. This wheel is formed in the conventional manner with a radial web 13 having an annular flange 14 whereon may be provided gear teeth 15 for co-action with a starting motor.

Figure 3:
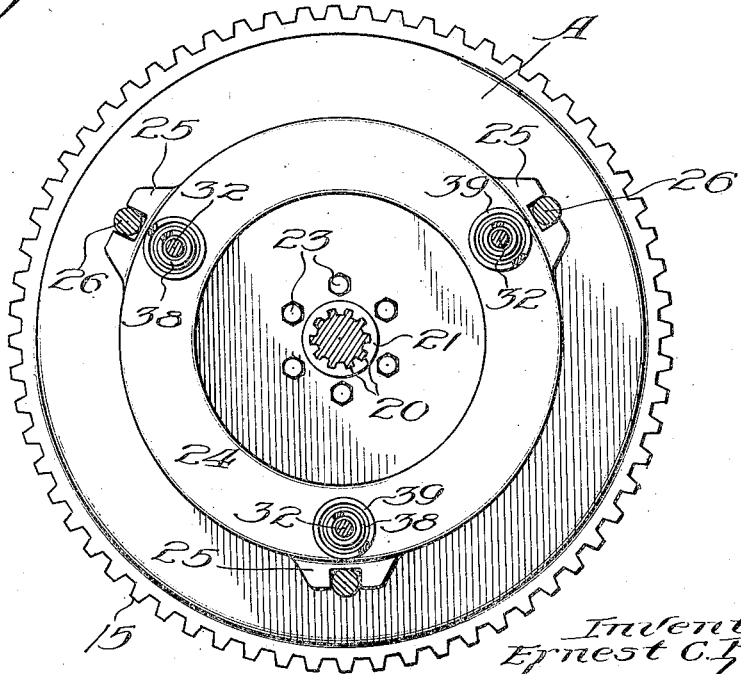

A socket 16 which is formed axially in the shaft end provides a bearing wherein is journaled the end 17 of a clutch shaft 18 with which are associated certain elements adapted to be driven by the fly wheel. Formed in the clutch shaft are one or more longitudinal grooves 19 wherein are received ribs 20 which project inwardly from a collar 21 having a radially extending flange 22. The collar is thus connected fast to the clutch shaft. As by means of bolts 23 I connect with this flange a disk unit B—the driven member—which may comprise one or more disks, presently to be described, for frictional engagement with the fly wheel. The disk unit is also adapted to engage frictionally with a friction plate in the form of a ring 24 having a plurality of notched or apertured lugs 25, preferably three in number (see Fig. 3). Disposed within the notch of each lug is a stud 26 having its opposite ends 27 and 28 reduced and threaded, the end 27 of each stud being extended through a hole in the fly wheel web and made fast thereto with the aid of a nut 29. The opposite end 28 of each stud is inserted through a clutch head in the form of a plate 30 and connected therewith as by means of nuts 31. By this construction I connect the clutch head fast to the fly wheel, so that it is revolved therewith, and at the same time provide a mounting for the friction plate such that it also is rotated with the driving member.

Extending between the friction plate and the head are a plurality of bolts 32, preferably three in number, each having a head 33 which terminates in an outwardly extending flange 34. Formed in the friction plate are a plurality of countersunk holes 35, one for each bolt, each of these holes having an inwardly extending annulus 36 for engaging with the smaller end of the bolt head. Each flange 34 normally stands in spaced relation to the associated annulus 36, as shown in Fig. 1, so as to permit of a limited endwise play between each bolt and the ring. Surrounding each bolt and adjacent its head is a collar 37 which receives the thrust from a compression spring 38 which also bears against the clutch head. Associated with each of these springs is a second compression spring 39 which surrounds the first and exerts pressure against the friction plate and the head. These outer springs, it should be noted, exert no pressure upon the bolt head, as do the inner springs, and for this reason they act alone to exert a pressure upon the disk unit during initial movement of the bolts relative to the friction plate.

The opposite bolt ends are each threaded to receive a nut 40 which lies in spaced relation to the head plate, and upon that side thereof which is remote from the several duplex springs. Each nut may be notched as at 41 to receive the bifurcated toe 42 which extends laterally from a lever 43 which is fulcrumed at 44 to a bracket 45 which is carried on the clutch head. The levers which correspond in number to the bolts, are each provided with a head 46 which extends laterally to bear against the flange 47 of a sleeve 48 which surrounds the clutch shaft, preferably in spaced relation thereto. As by means of a key 49 the sleeve is connected slidably to a hub 50 which is formed on the clutch head. In this manner, the head provides a fast mounting for the sleeve. I have further so formed the sleeve flange as to provide a mounting for a thrust collar 51, as shown.

The operating means for the clutch may be of any approved kind, such as an arm 52 having a head 53 adapted to exert pressure against the collar 51. For actuating the arm which is mounted fast upon a rock shaft 54, a second arm 55 having a pedal 56 may be employed.

The driven member B shown in Fig. 1 may consist of two disks 57 separated by a ring 58, preferably of asbestos fabric, which serves as a heat absorber. Rivets 59 may be used to connect the two disks together in unitary relation, and also for securing thereto certain friction pads 60 which are best shown in Figs. 4, 5 and 6. These pads are arranged upon opposite sides of the disk unit, in staggered relation, each having a generally rectangular form with one edge adjacent a slot 61 which is formed in the associated disk. As shown, six of these pads are used, and the several adjacent slots may all be tangential to a common circle, whose center is coincident with the axis of the clutch shaft.

In lieu of the double disk construction just described, a single disk 57 may be used for the driven member, as shown in Fig. 7. Upon the opposite sides of this disk are arranged friction pads 60 each adjacent a slot 61, the same as has already been described, and except for the absence of a second plate, together with a separating asbestos ring, the construction is identical with that which is elsewhere shown.

The normal engaging position of the clutch parts is as shown in Fig. 1. In this relationship they are maintained under the combined influence of the several duplex springs 38 and 39. If the collar 51 be moved in, however, the several levers will be rocked upon their fulcrums to draw the friction plate away from the disk unit. During the initial portion of this movement, the several bolts will be shifted longitudinally, due to the clearance between each flange 34 and its associated annulus 36. This movement is opposed only by the inner springs 38. Only the outer springs 39 are left to exert pressure against the friction plate during this initial movement. This results in easing (1) the operator's handling of the clutch and (2) the release action which obtains in the mechanism itself. By properly adjusting the position of the nuts 40 the friction plate will be required to bear with an even pressure against the disk unit in response to forces exerted by the several springs, and the movements of this plate in response to actuation of the control means may also be correlated to best advantage. By notching the nuts in some such manner as is shown, I provide means which assures their retention in any position of adjustment which may be selected. After taking up the play between the bolts and friction plate, any further release movement is opposed by both springs 38 and 39. Because of this serial operation of the components of the several duplex springs, the action of the clutch is smoother and more gradual than would be the case if single springs were used.

When pressure is applied to the driven member, the disk components thereof tend to flex radially, i. e., they assume a convex form relative to the driving member. This bending movement should be controlled evenly and for this purpose, I have weakened the disks by providing slots 61 which are symmetrically disposed on all sides of the clutch axis. By encouraging a bending of the disks at these several points, a desirable flexing action may take place without impairing the gripping or frictional qualities of the clutch.

While I have shown and described the preferred embodiment of my invention, I wish it to be understood that I do not confine myself to the precise details of construction herein set forth, by way of illustration, as it is apparent that many changes and variations may be made therein, without departing from the spirit of the invention, or exceeding the scope of the appended claims.

I claim:

1. A clutch having a driving member to which is connected a head in spaced relation, a driven member interposed therebetween, a friction plate interposed between the driven member and the head, spring means between the friction plate and clutch head tending to press the former against the driven member, bolts having a slip connection with the friction plate extended through the clutch head, other spring means associated both with the bolts and friction plate and bearing against the clutch head, the bolts being thereby free to move a limited distance in one direction without transmitting motion to the friction plate, a nut adjustably mounted on each bolt, and control means exerting a force upon the several nuts such as to move the friction plate against the serial tension of both sets of spring means, substantially as described.

2. A clutch having a driving member to which is connected a head in spaced relation, a driven member interposed therebetween, a friction plate interposed between the driven member and the head, a plurality of bolts each having a slip connection with the friction plate and extending through the head plate, two independent compression springs coiled around each bolt and exerting pressure against the friction plate and head, one of the springs bearing also against the bolt head, and means for drawing the plate toward the head against the serial opposition of the two springs, substantially as described.

3. A clutch having a driving member to which is connected a head in spaced relation, a driven member interposed therebetween, a friction plate interposed between the driven member and the head, a plurality of bolts each having a slip connection with the friction plate and extending through the head, two sets of independent spring means exerting pressure against the friction plate and head, one set of spring means also bearing against the bolt heads, and means for drawing the plate toward the head against the serial opposition of the two sets of spring means, substantially as described.

4. A clutch having a driving member to which is connected a head in spaced relation, a driven member engageable by the driving member, a friction plate also engageable with the driven member, serially acting spring means between the clutch head and friction plate tending to press the latter against the driven member, bolts connected to the friction plate and extended through the spring means and through the clutch head, a nut adjustably connected with each bolt, and a single control means engaging within each nut for withdrawing the friction plate from the driven member against the tension initially of one spring means and then against the tension of other spring means combined therewith, substantially as described.

5. A clutch having a driving member to which is connected a head in spaced relation, a driven member interposed therebetween, a plurality of spring units interposed between the head and driven member, each spring unit comprising two independently operable compression springs one surrounding the other, a common release means for all the spring units operable first upon the inner spring of each and later upon the outer spring of each unit, substantially as described.

6. A clutch having a driving member to which is connected a head in spaced relation, a driven member interposed therebetween, bolts extended between the head and driven member, a plurality of spring means surrounding the bolts, each spring means comprising two compression springs, one exerting pressure against the bolt end, and a common release means operable through the bolts serially upon both springs, substantially as described.

ERNEST C. PFAFF.